(12) United States Patent
Bryden et al.

(10) Patent No.: US 6,346,332 B1
(45) Date of Patent: Feb. 12, 2002

(54) LAMINATE SUBSTRATE WITH OXYGEN BARRIER PROPERTIES

(75) Inventors: Kenneth John Bryden, Ellicott City, MD (US); David Hillis Hawes; Ralph Scott Peterson, both of Clifton Forge, VA (US)

(73) Assignee: Westvaco Corporation, Stamford, CT (US)

( * ) Notice: Subject to any disclaimer, the term of this patent is extended or adjusted under 35 U.S.C. 154(b) by 0 days.

(21) Appl. No.: 09/619,678

(22) Filed: Jul. 19, 2000

(51) Int. Cl.[7] .................. B32B 27/00; B32B 29/00; B29D 22/00
(52) U.S. Cl. ............... 428/474.4; 428/34.1; 428/34.2; 428/34.6; 428/34.7; 428/411.1; 428/475.8; 428/476.1; 428/479.6; 428/511; 428/513; 156/82; 156/324; 156/497; 264/176.1
(58) Field of Search .................. 428/474.4, 34.1, 428/34.2, 34.6, 34.7, 476.1, 479.6, 511, 513, 475.8, 411.1; 156/82, 324, 497

(56) References Cited

U.S. PATENT DOCUMENTS

| | | | |
|---|---|---|---|
| 4,701,360 A | 10/1987 | Gibbons et al. ............. 428/35 |
| 4,777,088 A | 10/1988 | Thompson et al. ......... 428/323 |
| 5,028,462 A | 7/1991 | Matlack et al. ............ 428/35.7 |
| 5,116,649 A * | 5/1992 | Massouda ................. 428/34.2 |
| 5,175,036 A * | 12/1992 | Smiley et al. ............. 428/36.7 |
| 5,175,238 A | 12/1992 | Matlack et al. ............ 528/339 |
| 5,433,982 A | 7/1995 | Yamada et al. ............ 428/35.7 |
| 5,505,011 A * | 4/1996 | Farrell et al. .............. 428/34.2 |
| 5,552,002 A * | 9/1996 | Farrell et al. .................. 156/82 |
| 5,695,839 A | 12/1997 | Yamada et al. ............ 428/35.7 |
| 5,712,006 A * | 1/1998 | Marano et al. ............ 428/34.2 |
| 5,725,917 A | 3/1998 | Parks ........................ 428/34.2 |
| 5,866,649 A | 2/1999 | Hong et al. ................. 524/538 |
| 6,010,759 A | 1/2000 | Yamada et al. ............ 428/35.7 |
| 6,110,548 A * | 8/2000 | Kinsey ...................... 428/34.2 |
| 6,113,719 A * | 9/2000 | Parks et al. .................. 156/82 |
| 6,149,993 A * | 11/2000 | Parks et al. ............... 428/34.2 |
| 6,193,827 B1 * | 2/2001 | Parks et al. .................. 156/82 |

FOREIGN PATENT DOCUMENTS

JP Hei81996-316878 6/1998

* cited by examiner

Primary Examiner—P. Hampton-Hightower
(74) Attorney, Agent, or Firm—D. L. Bowman; T. B. McDaniel; R. L. Schmalz

(57) ABSTRACT

This invention relates to a laminate substrate. An exemplary embodiment comprises a paperboard layer with a heat sealable layer secured substantially adjacent to one side of the paperboard layer. A co-extruded layer is secured substantially adjacent to the other side of the paperboard layer. The co-extruded layer has five layers: a heat sealable layer secured to the paperboard layer, a first tie layer secured adjacent to the heat sealable layer, a semi-crystalline nylon layer secured adjacent to the first tie layer, a second tie layer secured adjacent to the semi-crystalline nylon layer, and a heat sealable layer secured adjacent to the second tie layer. A fourth heat sealable layer is secured adjacent to the co-extruded layer.

12 Claims, 1 Drawing Sheet

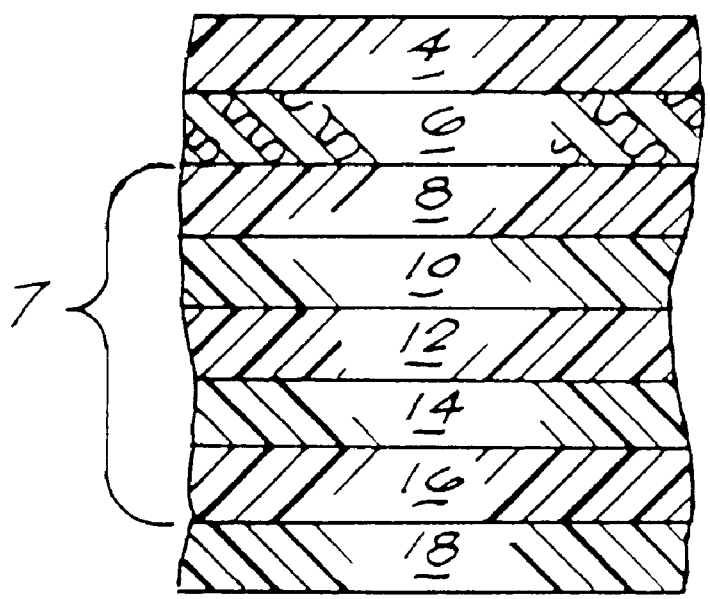
FIGURE

LAMINATE SUBSTRATE WITH OXYGEN BARRIER PROPERTIES

BACKGROUND OF THE INVENTION

1. Field of the Invention

The invention relates to a laminate substrate with oxygen barrier properties. Such structures of this type are generally useful to prevent spoilage and degradation of food and liquid material stored in containers made from the laminate substrates.

2. Description of the Related Art

Structures for packaging food and liquids, such as orange juice, have typically contained barrier layers made from amorphous nylon or combinations of nylon or ethylene vinyl alcohol (EVOH). Exemplary of such prior art is commonly owned U.S. Pat. No. 5,725,917 ('917) to C. J. Parks, entitled "Barrier Laminate With Improved Interlayer Adhesion" and U.S. Pat. No. 6,113,719 ('719) also to C. J. Parks, entitled "Oxygen and Flavor Barrier Laminate Including Amorphous Nylon." As an example, a structure based on the '917 reference, containing approximately 6 lbs/3000 ft$^2$ of amorphous nylon, typically has an oxygen transmission rate of 2.3 cc/100 in$^2$/day/atm at 80% relative humidity and 23° C. In order to achieve a higher oxygen barrier, heavier coat weights of an amorphous nylon layer and tie layer must be used. However, use of excessively high coat weights of amorphous nylon layers becomes prohibitively expensive. Also, it might not be possible to apply heavier amorphous nylon coat weights due to limitations in extruder output.

It is also known to use Nylon-MXD6® manufactured by Mitsubishi Gas and Chemical Corporation as a barrier layer. Nylon-MX6® has a substantial degree of crystallinity. It is commonly referred to in the art as semi-crystalline nylon. It is made by the condensation of adipic acid and 1,3-benzenedimethanamine. The process forms a compound with different physical and chemical properties as compared to amorphous nylon. Exemplary of such prior art are U.S. Pat. Nos. 5,433,982 ('982) to K. Yamada et al., entitled "Composite Container Having Barrier Property", U.S. Pat. No. 5,695,839 ('839) to K. Yamada et al., entitled "Composite Container Having Barrier Property", and 6,010,759 ('759) to K. Yamada et al., entitled "Composite Container Having Barrier Property." While the '982, '839, and '759 references employ the use of Nylon-MX6®, they describe a paperboard sheet coated on both sides with polyethylene (PE) which is subsequently laminated with a sheet of co-extruded material including the Nylon-MXD6® using isocyanate glue or fusing under heat. Therefore, a more advantageous laminate substrate would be one that avoided the use of glue and/or fusing under heat.

It is apparent from the above that there exists a need in the art for a laminate substrate which has a low oxygen transmission rates. It is a purpose of this invention to fulfill this and other needs in the art in a manner more apparent to the skilled artisan once given the following disclosure.

SUMMARY OF THE INVENTION

The invention provides a laminate substrate with good barrier properties, such as low oxygen transmission rates. An exemplary embodiment comprises a paperboard layer with a heat sealable layer secured substantially adjacent to one side of the paperboard layer. A co-extruded layer is secured substantially adjacent to the other side of the paperboard layer. The co-extruded layer has five layers: a heat sealable layer secured to the paperboard layer, a first tie layer secured adjacent to the heat sealable layer, a semi-crystalline nylon layer secured adjacent to the first tie layer, a second tie layer secured adjacent to the semi-crystalline nylon layer, and a heat sealable layer secured adjacent to the second tie layer. A fourth heat sealable layer is secured adjacent to the co-extruded layer.

The above and other features of the present invention, which will become more apparent as the description proceeds, are best understood by considering the following detailed description in conjunction with the accompanying FIGURE:

A BRIEF DESCRIPTION OF THE DRAWING

The FIGURE is a schematic illustration of a laminate substrate, according to the present invention.

DETAILED DESCRIPTION OF THE INVENTION

With reference first to the FIGURE, there is illustrated an advantageous environment for use of the concepts of the invention. In particular, a laminate substrate 2 is illustrated. Laminate substrate 2 includes a paperboard layer 6, a heat sealable layer 4 on one side of the paperboard layer and five layers 8, 10, 12, 14, and 16 secured to the other. The five layers 8, 10, 12, 14, and 16 are referred to as a co-extrusion layer 7. A heat sealable layer 18 is shown secured to the co-extrusion layer 7.

Paperboard layer 6 is typically a 0.018 inch thick sheet. The term paperboard generally describes paper within the thickness range of about 0.004 to about 0.028 inches. It is to be understood that paperboard layer 6 may be formed from bleached and/or unbleached pulp stock or recycled paperboard. The invention is relative to a wide range as applied to packaging arts.

Paperboard layer 6 may be coated on one side with a fluidized mixture of finely particulated minerals and binders as a smooth layer. Minerals, such as clay and calcium carbonate, are most frequently used. Successive densification and polishing by calendering finishes the mineral coated surface to the high degree of smoothness and a superior surface. If a coating is used with paperboard layer 6, the heat sealable layer 4 and coextrusion layer 7 can be applied to either side whether coated or uncoated.

Co-extrusion layer 7 consists of a five-layers 8, 10, 12, 14, 16. The first layer 8 is a heat sealable layer 8 secured to the paperboard layer 6, preferably a low density polyethylene (LDPE). A first tie layer 10 is secured to the heat sealable layer 8, preferably includes anhydride-modified linear low density polyethylene. A semi-crystalline nylon layer 12 manufactured by the condensation of adipic acid and 1,3-benzenedimethanamine is secured to the tie layer 10. An exemplary semi-crystalline nylon layer is Nylon-MXD6®). A second tie layer 14 is secured to the semi-crystalline nylon layer 12, preferably the same material as first tie layer 10. Finally, a heat sealable layer 16 is secured the second tie layer 14, preferably the same material as the first heat sealable layer 8. In forming the laminate substrate 2, the co-extrusion 7 is laminated to paperboard substrate 6 by conventional techniques.

In order to prove the barrier effectiveness of laminate substrate 2, oxygen transmission rates were measured in samples produced using substrates 2 with various and coextrusion 7 coating weights. A first sample had an average nylon layer 12 with a coat weight of about 7.6 lbs/3000 ft$^2$. The measured oxygen transmission weight (OTR) in the sample was 1.9–2.0 cc/100 in$^2$/atm/day at room temperature and 80% relative humidity. When normalized in terms of nylon layer 12 thickness, this gives an OTR of 0.76–0.8 cc-mil/100 in$^2$/atm/day. A second substrate sample consisting of a single nylon layer 12 was also produced. Its OTR was 0.16–0.32 cc-mil/100 in$^2$/atm/day.

A third sample was made with a co-extrusion layer 7 having a coat weight of 10 lbs/3000 ft$^2$. The third sample had a OTR of 0.44–0.54 cc/100 in$^2$/atm/day at 80% relative humidity and 23° C. The third sample had an OTR that was significantly better than the OTR of 2.3 cc/100 in$^2$/atm/day that is typically found for a structure with 6 lbs/3000 ft$^2$ of amorphous nylon. If the OTR of a laminate substrate is expressed in terms of nylon layer 12 thickness, the OTR of the Nylon-layer 12 of the present invention was 0.23–0.28 cc-mil/100 in$^2$/atm/day, while a typical value for a co-extrusion made with prior art amorphous nylon would be 0.7 cc-mil/100 in$^2$/atm/day.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A laminate substrate comprising:
   a paperboard layer with a first side and a second side;
   a heat sealable layer secured to a first side of said paperboard layer; and
   a co-extruded layer secured to a second side of said paperboard layer, wherein said co-extuded layer comprises a first heat sealable layer, a first tie layer secured adjacent to said first heat sealable layer, a semi-crystalline nylon layer secured to said first tie layer, a second tie layer secured to said semi-crystalline nylon layer, and a third heat sealable layer secured to said second tie layer.

2. The laminate substrate of claim 1, wherein a heat sealable layer is secured to said co-extrusion layer.

3. The laminate substrate of claim 1, wherein said tie layers comprise anhydride-modified linear low density polyethylene.

4. The laminate substrate claim 1, wherein said semi-crystalline nylon layer comprises a condensation of adipic acid and 1,3-benzenedimethanamine.

5. The laminate substrate of claim 1, wherein said first and second tie layers have a coat weight of approximately 2–4 lbs/3000 ft$^2$ each.

6. The laminate substrate of claim 1, wherein said semi crystalline nylon layer has a coat weight of approximately 5–10 lbs/3000 ft$^2$.

7. A method of forming a laminate substrate comprising the steps of:
   providing a paperboard layer;
   securing a heat sealable layer to a first side of said paperboard layer;
   securing a co-extrusion layer to a second side of said paperboard layer, wherein said co-extrusion layer comprises a first heat sealable layer, a first tie layer secured to said first heat sealable layer, a semi crystalline nylon layer secured to said first tie layer, a second tie layer secured to said semi crystalline nylon layer, and a second heat sealable layer located adjacent to said second tie layer.

8. The method, as in claim 7, wherein a heat sealable layer is secured to said co-extrusion layer.

9. The method, as in claim 7, wherein said tie layers comprise anhydride-modified linear low density polyethylene.

10. The method, as in claim 7, wherein said semi crystalline nylon layer comprises a condensation of adipic acid and 1,3-benzenedimethanamine.

11. The method, as in claim 7, wherein said first and second tie layers have a coat weight of approximately 2–4 lbs/3000 ft$^2$.

12. The method, as in claim 7, wherein said semi crystalline nylon layer has a coat weight of approximately 5–10 lbs/3000 ft$^2$.

* * * * *